(12) United States Patent
Biehl et al.

(10) Patent No.: US 7,331,563 B2
(45) Date of Patent: *Feb. 19, 2008

(54) VALVE WITH COMPACT ACTUATING MECHANISM

(75) Inventors: Margit Biehl, St. Wendel (DE); Christoph Miethke, Rehbruecke (DE)

(73) Assignees: AESCULAP AG & Co. KG, Tuttlingen (DE); Christoph Miethke GmbH & Co. KG, Kleinmachnow (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/359,203

(22) Filed: Feb. 21, 2006

(65) Prior Publication Data
US 2006/0138370 A1    Jun. 29, 2006

Related U.S. Application Data

(63) Continuation of application No. 11/041,186, filed on Jan. 21, 2005, now Pat. No. 7,055,793, which is a continuation of application No. PCT/DE03/02380, filed on Jul. 15, 2003.

(30) Foreign Application Priority Data
Jul. 24, 2002    (DE)    ................. 102 33 601

(51) Int. Cl.
*F16K 31/00*    (2006.01)
*F16K 31/18*    (2006.01)
(52) U.S. Cl. ................... 251/11; 251/129.06
(58) Field of Classification Search .......... 251/11, 251/129.01, 129.06
See application file for complete search history.

(56) References Cited

U.S. PATENT DOCUMENTS

| 3,725,835 A | 4/1973 | Hopkins et al. |
|---|---|---|
| 4,750,520 A | 6/1988 | Heim et al. |
| 4,772,807 A | 9/1988 | Bouvot |
| 4,973,024 A | 11/1990 | Homma |
| 5,037,062 A | 8/1991 | Neuhaus |
| 5,079,472 A | 1/1992 | Uhl et al. |
| 5,345,963 A | 9/1994 | Dietiker |
| 5,865,418 A | 2/1999 | Nakayama et al. |

(Continued)

FOREIGN PATENT DOCUMENTS

DE    36 08 550    9/1987

(Continued)

*Primary Examiner*—John Rivell
*Assistant Examiner*—John K. Fristoe, Jr.
(74) *Attorney, Agent, or Firm*—Lipsitz & McAllister, LLC

(57) ABSTRACT

The present invention relates to a valve having a base body with a passage opening, a movable valve member for closing and opening the passage opening and an actuating mechanism for moving the valve member in order to open the passage opening. The actuating mechanism has at least two elements made from a shape memory alloy which are secured to the base body or a carrier body connected thereto, and can be alternately shortened in the event of the temperature rising above a threshold temperature and are connected to the valve member in such a way that the valve member can be moved from a position on the passage opening into a position alongside the passage opening when one element is shortened on one side and can be moved back into the position on the passage opening when the other element is shortened on one side.

15 Claims, 3 Drawing Sheets

U.S. PATENT DOCUMENTS

| | | |
|---|---|---|
| 6,450,204 B2 | 9/2002 | Itzhaky |
| 6,840,257 B2 | 1/2005 | Dario et al. |
| 6,843,465 B1 | 1/2005 | Scott |
| 7,055,793 B2 * | 6/2006 | Biehl et al. .................. 251/11 |
| 2005/0005980 A1 | 1/2005 | Eberhardt et al. |

FOREIGN PATENT DOCUMENTS

| | | |
|---|---|---|
| DE | 36 35 216 | 4/1988 |
| DE | 37 31 146 | 3/1989 |
| DE | 37 44 240 | 7/1989 |
| DE | 38 35 788 | 4/1990 |
| DE | 39 35 474 | 1/1991 |
| DE | 43 22 731 | 1/1995 |
| DE | 199 63 499 | 2/2001 |
| DE | 199 61 736 | 6/2001 |
| DE | 697 09 529 | 5/2002 |
| DE | 100 62 704 | 7/2002 |
| DE | 101 62 498 | 7/2003 |
| JP | 61-103081 | 5/1986 |

* cited by examiner

VALVE WITH COMPACT ACTUATING MECHANISM

This application is a continuation of U.S. patent application Ser. No. 11/041,186 filed on Jan. 21, 2005, which is a continuation of international patent application no. PCT/DE2003/002380 filed on Jul. 15, 2003, which claims the benefit of German patent application no. 102 33 601.6 filed on Jul. 24, 2002, both of which applications are incorporated herein and made a part hereof by reference.

BACKGROUND OF THE INVENTION

The present invention relates to a valve, in particular a ball valve, which comprises a base body with a passage opening, a movable valve member for closing and opening the passage opening and an actuating mechanism, by means of which the valve member can be moved in order to open up the passage opening, the actuating mechanism having at least two elements in wire form made from a shape memory alloy, which are secured to the base body or a carrier body connected thereto and can be shortened in the event of the temperature rising to a temperature above a threshold temperature.

Valves play an important role in many technical fields in order to control the flow of a medium. They can also be used to meter defined volumes and to provide or block off continuous streams of fluid. Actively switching valves are moved from the closed state into the open state or vice versa when energy is supplied. In many applications, the actuating mechanism for opening and if appropriate closing the valves needs to take up as little space and energy as possible.

DE 38 35 788 A1 has disclosed a fast-switching ball valve which comprises a base body having a passage opening, a ball for closing and opening the passage opening and an actuating mechanism which can be used to move the ball in order to open up the passage opening. In the closed state of the valve, the ball is pressed onto the passage opening by the applied pressure of the gas flow. To open up the passage opening, the actuating mechanism moves the ball away from the passage opening. For this purpose, an actuating element of the actuating mechanism exerts a lateral impact on the ball, which is then released from the passage opening or the valve seat of the passage opening. The ball is returned to the valve seat under the influence of the gas flow which is introduced. In this document, a pulse-operated electromagnet is used as actuating mechanism for displacement of the ball, and after actuation the electromagnet is returned to the starting position by a spring force. An actuating mechanism with an electromagnet of this type takes up considerable space, however, and also consumes too much energy for many applications.

W. Ehrfeld et. al. "Mikroactoren—Wirkprinzipien, Fertigungstechnologien und Applikationen" [Micro-actuators—principles of operation, manufacturing technology and applications] in Rainer Nordmann et al. (Eds.): Kolloquium Aktoren in Mechatronischen Systemen Mar. 11, 1999, pages 14-16 has described a fast-switching micro-ball valve with a ball size of approx. 100 µm, which is actuated by a piezo-ceramic multilayer actuator. The advantage of this valve is the small overall size and the low energy consumption for the piezo-ceramic actuator used as drive compared to an electromagnetic drive. However, one drawback of this piezo-ceramic actuator is that it can only generate displacements in the µm range. Consequently, this actuating mechanism is not suitable for actuating the ball of a larger ball valve.

In this configuration too, the ball is only knocked off the valve seat for a short time and in pulsed fashion before then returning to its original position as a result of the flow of liquid. If the open valve state is to be maintained for a longer period of time, in both the above-mentioned valves a rapid succession of repeated actuations of the actuator is required. This constantly consumes energy for as long as the valve is to remain open.

Documents DE 199 61 736 A1, DE 39 35 474 A1, DE 37 44 240 A1 and DE 36 08 550 A1 describe valves which have piezo-electric actuators for actuating the valve bodies. For example, DE 199 61 736 A1 presents a valve which has a sealing element which is held on a piezo-electric bending transducer and can be used to close off a valve passage.

DE 100 62 704 A1 describes an electro-mechanical component having at least two actuators made from a shape memory alloy, which change shape when a defined temperature is reached and move as a result of this change. One significant feature of the component described is that the two actuators in each case change shape at different temperatures.

Documents DE 697 09 529 T2, DE 199 63 499 A1, DE 43 22 731 A1, DE 36 35 216 A1, U.S. Pat. No. 5,345,963 A, U.S. Pat. No. 4,973,024 A and JP 61103081 A describe valves in accordance with the preamble of patent claim 1, in which the elements in wire form, which consist of a shape memory alloy, constantly have to be moved against a further stressing element, preferably a spring, during closing or opening of a valve. The movement of the valve member in at least one direction, i.e. either opening or closing of the valve, is in this case effected with the aid of an additional spring element.

The object of the present invention is to provide a valve, in particular a ball valve, having a compact and energy-efficient actuating mechanism which can be used even for actuating displacements in the millimeter range.

SUMMARY OF THE INVENTION

The object is achieved by the valve in accordance with patent claim 1. Advantageous configurations of the valve form the subject matter of the subclaims or can be taken from the following description and the exemplary embodiments.

In a known way, the present valve has a base body with a passage opening, a movable valve member for closing and opening the passage opening and an actuating mechanism which can be used to move the valve member in order to open up the passage opening. The edge of the passage opening itself may in this case form the valve seat for the valve member. Of course, it is also possible for a separate valve seat, on which the valve member is located in the closed valve state, to be formed in the region of the passage opening. In the case of the present valve, the actuating mechanism is composed of at least two elements in wire form made from a shape memory alloy, which are secured to the base body or a carrier body connected to the base body and can be shortened on alternate sides in the event of the temperature rising to a temperature above a threshold temperature. The elements in wire form are operatively connected to the valve member in such a way that the valve member can be moved from a stable position on the passage opening into a stable position close to the passage opening in the event of shortening of one element on one side and can be moved back into the stable position on the passage opening in the event of shortening of the other element on one side. The shortening is in each case effected by pulsed heating of one element or the other. The elements in wire form may be secured either directly to the valve member or to a guide element for the valve member. This type of guide element for the valve member may be formed, for example, by a bearing housing which partially surrounds the ball of a ball valve.

The use of elements in wire form made from a shape memory alloy (SMA) makes it possible to realize an energy-efficient and compact actuating mechanism for the valve member of the valve. Shape memory alloys have the property of returning to their original shape after they have been heated to a temperature above a threshold temperature. The person skilled in the art is aware of numerous metal alloys, such as for example TiNiPd, TiNi, CuAl, CuZnAl or CuAlNi, which have these properties. Shape memory alloys have by far the highest mechanical energy density, i.e. the highest mechanical capacity of work per unit volume. The highest energy efficiency can be achieved in particular with elements in wire form made from a shape memory alloy, also referred to below as SMA wires. When they are heated, for example by a flow of electric current, these SMA wires contract in the longitudinal direction and in the process can perform mechanical work. In the case of the present valve, at least two SMA wires of this type are required, since each SMA wire can only act as an actuator in one direction. The mechanical energy which is provided by each of the two actuators serves primarily to move the valve member, but must also be sufficient to cause the SMA wire which has already been shortened and acts in the opposite direction to stretch back to the original length. On account of the high energy efficiency of shape memory alloys in wire form of this nature, the present valve can be operated with minimal energy consumption. A further advantage is that the present actuating mechanism, in which just two SMA wires are disposed and have to be acted on with a current, for example, in order to be heated or actuated, can be of very compact and space-saving implementation. In particular, this actuating mechanism is able to effect movements of the valve member not only in the μm range but also in the mm and cm range.

In a particularly advantageous configuration, the present valve is realized as a ball valve with binary opening characteristics. In this case, the valve member, which is formed as a ball, is located in the stable disposition both in the open position and in the closed position with the actuating mechanism unactivated, and consequently no energy need be applied to maintain the open and closed states of the valve. This saves energy, since energy is only required to switch between the open position and the closed position but not to maintain one of the two end positions of the valve. In the closed valve position, the valve member in ball form is located in a sealing manner on the passage opening, and in the open position rests laterally beside the passage opening, in a recess in the base body. The actuating mechanism displaces the valve member between these two positions. It is preferable for the two stable positions of the valve member in ball form to be assisted by an elastic element, for example a coil spring, which presses the valve member onto the passage opening or the recess as appropriate. In one configuration of this ball valve with a binary opening characteristic, a ball with a diameter of approx. 3 mm is used, and the actuating mechanism has to move this ball approx. 1.5 mm between the open and closed positions. This requires an initial force of approx. 30 mN, which can readily be applied by the actuating mechanism described above.

Although the present description and the following exemplary embodiments in each case describe a ball valve, it will be clear to the person skilled in the art that the valve according to the invention can also be realized in other configurations, for example with a differently shaped valve member or a valve flap as the valve member.

BRIEF DESCRIPTION OF THE DRAWINGS

The present invention is explained in more detail below on the basis of exemplary embodiments in combination with the drawings, in which.

DETAILED DESCRIPTION

Figure 1A:
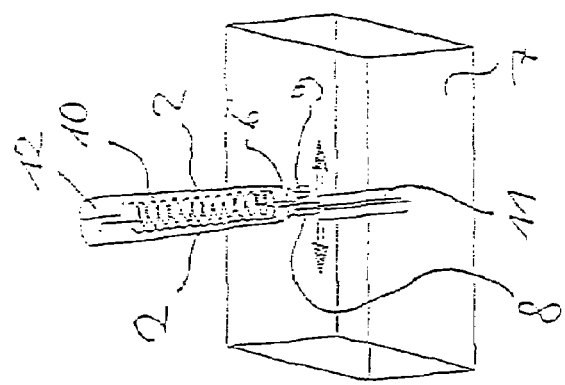
FIG. 1 shows four conceptual options in sub-FIGS. 1A, 1B, 1C, and 1D for the positioning of the SMA wires in a valve in accordance with the present invention.

FIG. 1, in the four sub-FIGS. 1A, 1B, 1C, and 1D, shows four different options for the positioning of the SMA wires 2 of the present actuating mechanism relative to the base body 7, as well as the valve member 3, which may be formed as a ball 6, of the present valve. The four sub-figures in this case serve only to provide illustration in principle, and consequently further elements of the valve, such as for example the way in which the SMA wires are secured, are not illustrated.

All the sub-figures diagrammatically depict the base body 7 of the valve with the passage opening 8 which is disposed therein and opens out into a valve outlet 11. Next to the passage opening 8, a recess 9 with a blind end is formed in the base body 7, also referred to below as the valve base. In all four illustrations, the ball 6 is above the valve opening 8 in the closed valve state and above the recess 9 in the open valve state. In all cases, the ball 6 is held on the desired position by an elastic mechanical element, for example the coil spring 10 illustrated in the figure, so that a bistable position of the ball 6 is achieved. The coil spring 10 is disposed with its axis perpendicular to the valve base 7, in the center between the two stable ball positions, and is secured to an adjusting screw 12 of the valve. The direction of movement of the ball 6 for opening and closing the valve is indicated by the double arrows. The movement is effected by the actuating mechanism, indicated by the two SMA wires 2. The length of these SMA wires 2 is such that, even in the fully-extended state which results from the two positions of the ball 6, they do not exceed an extension of 2%. The thickness of the wire is in each case adapted to the force that needs to be applied to move the ball 6. The greater this force to be applied is, the thicker the SMA wires 2 have to be made.

In the simplest configuration of the actuating mechanism, the displacement of the ball 6 between the two positions is realized by direct contraction of the SMA wire in the desired direction of movement of the ball, as can be seen, by way of example, from sub-FIG. 1A. In this case, the two wire ends which face toward the ball 6 may be secured, for example, to a suitable ball holder (not shown) for the ball 6. In this illustration, they extend on one common line which corresponds to the axis of movement of the ball 6. Of course, the two wire ends which are remote from the ball 6 have to be correspondingly fixed relative to the base body 7, for example directly to this base body. When the left-hand SMA wire 2 is heated through the application of a current to this wire, the ball 6 is moved onto the passage opening 8, with the right-hand SMA wire 2 being extended at the same time.

If the right-hand SMA wire 2 is then heated, the ball 6 moves back into the open position onto the recess 9, with the left-hand SMA wire being extended again this time. In this way, it is possible to achieve alternating opening and closing of the valve by alternately acting on the left-hand and right-hand wires 2. To enable the ball 6 to be displaced by 1.5 mm in this way, however, a wire length of in each case 37.5 mm is required. In this case, to achieve a low overall size of the valve, a diverter mechanism for the two SMA wires 2 should be used.

Figure 1B:
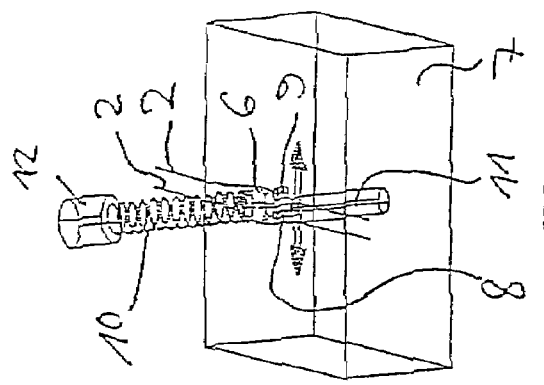

Shorter but thicker SMA wires 2 can be employed using a lever mechanism, as illustrated in sub-FIG. 1B. In this configuration, the ball 6 or a ball holder for this ball is secured to a lever element 4, the lever axis of which is indicated by the arrow in the figure. In this example, the two SMA wires 2 act on the lever element 4 in opposite directions. A configuration of this nature makes it possible to achieve greater paths of displacement of the ball 6 with shorter SMA wires, on account of the lever action. However, this requires the application of a greater force, and consequently the SMA wires have to be selected thicker than in the other exemplary embodiments.

Figure 1C:
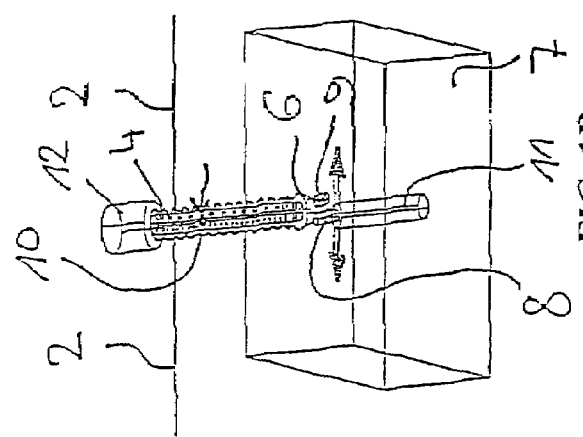

A particularly advantageous configuration of the present valve is achieved with the arrangement of the SMA wires 2 in accordance with sub-FIG. 1C. In this configuration, two SMA wires 2 are used which run parallel to one another and are mounted perpendicular to the desired direction of movement of the ball 6. If one of the two wires 2 is heated by the flow of current, it becomes shorter, tightens and in so doing displaces the ball 6 perpendicular to the length of the wire and parallel to the valve base 7 onto the desired position. The displacement of the ball 6 causes the oppositely acting, unheated wire to be extended, and this latter wire, as soon as it is heated and contracts again, can then move the ball back onto its original position. In the process, the wire which was active first and has now cooled down is extended again and can then in turn once again serve as an actuator. In this case, the two SMA wires 2 have to be disposed in such a way that in the maximum-contracted, rectilinear state of in each case one of the wires, the ball 6 comes to be located accurately on one of the two desired positions. For this purpose, it is necessary for the two SMA wires 2 to partially surround the ball 6, as can be seen from the figure. Of course, both ends of each SMA wire must in each case be secured to the base body 7 or a carrier body that is suitably connected to the base body 7. This solution allows simple mechanical securing and electrical contact-connection of the SMA wires 2 when the latter are secured to a rigid base, such as for example an aluminum oxide ceramic. The base may simultaneously serve as a carrier for conductor path structures for electrical contact-connection of the wires 2 and electronic components. Simultaneous securing and contact-connection can then be effected by an adhesive of good conductivity or by soldering. By way of example, securing and contact-connection by means of spring-clamp contacts which press the wires 2 onto the rigid base is also possible. For a displacement of 1.5 mm, a wire length of only in each case 14.9 mm is required with this type of configuration of the actuating mechanism. Consequently, this configuration is distinguished by a particularly compact overall construction.

Figure 1D:
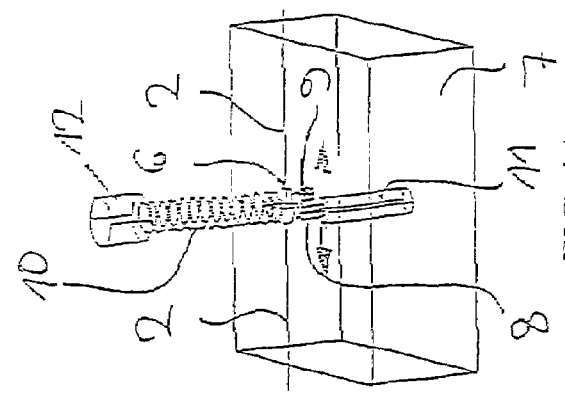

The fourth sub-figure 1D shows a configuration in which the SMA wires 2 are disposed on either side of the coil spring 10 and approximately parallel to the axis of the latter. They may, for example, be mechanically connected to a suitable metallic ball holder for the ball 6 at the end of the coil spring 10. If the two wires 2 are heated by the flow of current, their length is shortened so that they contract the coil spring 10 and lift the ball 6 out of the valve seat of the passage opening 8. If the passage of current through the left-hand one of the two wires 2 is then stopped, so that this wire cools down, while the right-hand wire 2 still continues to have current flowing through it for a short time, the coil spring 10 bends in the direction of the wire through which current is flowing and therefore also moves the ball 6 in the corresponding direction. Then, the supply of current to the right-hand wire is also stopped, so that the latter cools down. As a result, the length of the spring 10 increases and the ball 6 latches into the desired stable end position of the recess 9. To move the ball 6 back, the operation described above is carried out again. However, in this case the right-hand wire must first of all be cooled. The coil spring 10 then bends in the opposite direction and the ball 6, after cooling, latches into the second position above the passage opening 8. This configuration can likewise be realized in a very compact overall construction. In principle, both configurations shown in sub-FIGS. 1C and 1D allow the energy consumption for a single actuation of the valve to be limited to less than 5 mWs with a minimal space requirement. This applies to a configuration of the valve with a sapphire ball 6 having a diameter of approx. 3 mm which needs to be moved by a distance of approx. 1.5 mm between the two stable positions.

Figure 2:
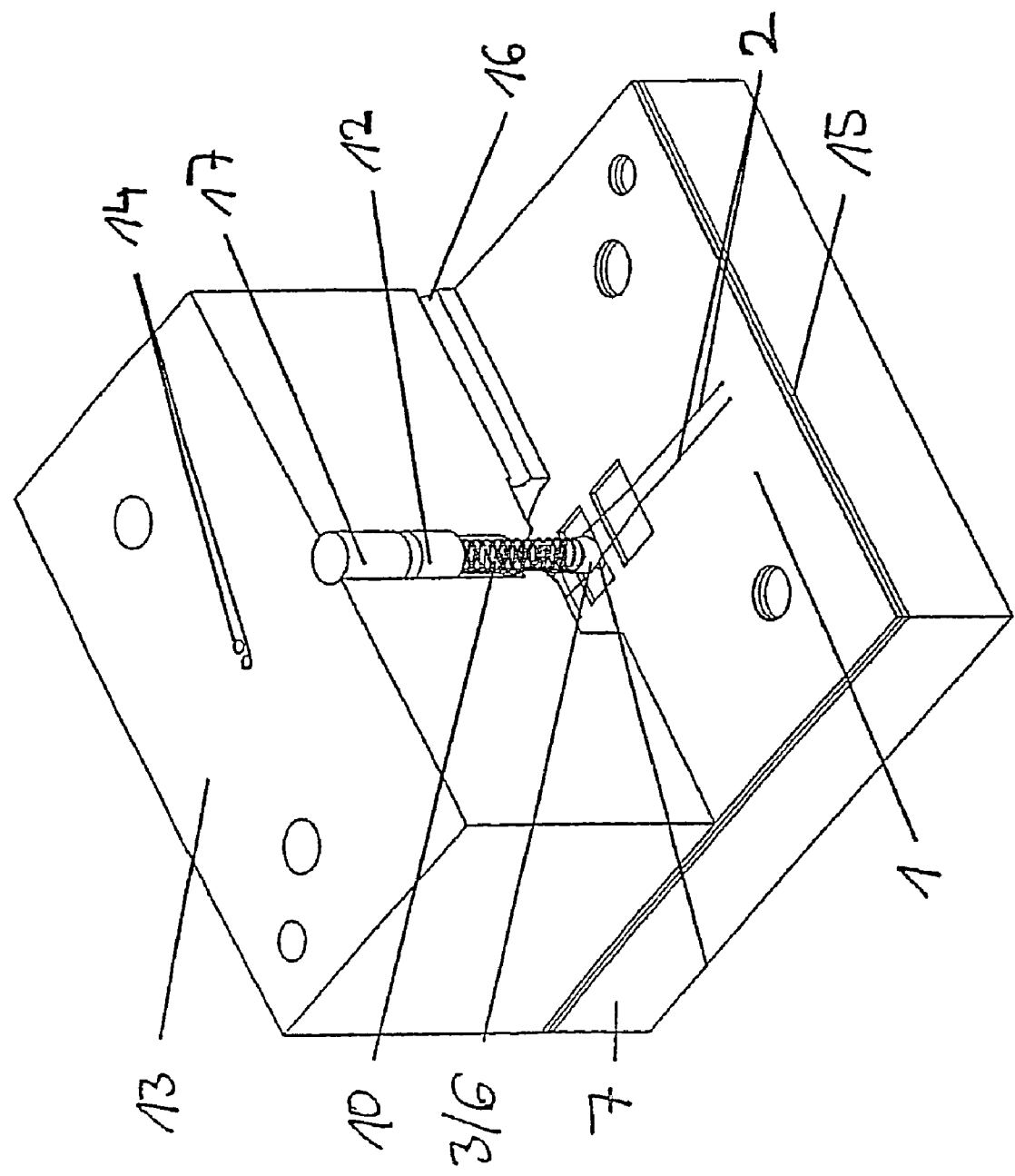
FIG. 2 shows a more detailed exemplary embodiment of the present valve.

FIG. 2 shows a more detailed illustration of an exemplary embodiment of the present ball valve in the form of a half cross-sectional illustration, in which the SMA wires 2 are disposed in accordance with the configuration of the sub-FIG. 1C of FIG. 1. In this exemplary embodiment, the free ends of the SMA wires 2 are adhesively bonded securely to a carrier plate 1 made from aluminum oxide ceramic and are contact-connected by means of CuBe clamping contacts which are led out of the valve. This illustration does not reveal the contact-connection, but rather only the CuBe contact springs 14 projecting out of the cover 13 of the valve. The carrier plate 1 is secured to the base body 7 of the valve, with a silicone sealing sheet 15 disposed between the base body 7 and the carrier plate 1. Of course, suitable cut-outs have to be provided in the carrier plate 1 and the silicone sealing sheet 15 above the passage opening 8 to allow liquid to flow out of the base body 7, as can be seen in the figure. A cover 13 of the valve, into which a liquid feed passage 16 is formed for supplying the liquid to the passage opening 8, is fitted onto the carrier plate 1. Furthermore, an adjusting screw 12 for securing the coil spring 10 and a sealing screw 17 located above screw 12 are integrated into the cover 13. The coil spring 10 presses the ball 6 onto the passage opening 8 or the recess 9, which is not visible in this figure. The pressure with which the ball 6 is pressed onto the passage opening 8 or the recess 9 can be set by means of the adjusting screw 12. The ball 6 can be moved alternately into the open and closed positions by the application of a suitable flow of current to the SMA wires 2.

It can be seen from the FIG. 2 that the actuating mechanism, which substantially comprises the SMA wires 2 secured to the carrier plate 1 and their electrical contact-connection 14, takes up only minimal space. The SMA wires 2 may be in the form of ohmic resistors which can be heated to above the threshold temperature by the application of current.

Figure 3:
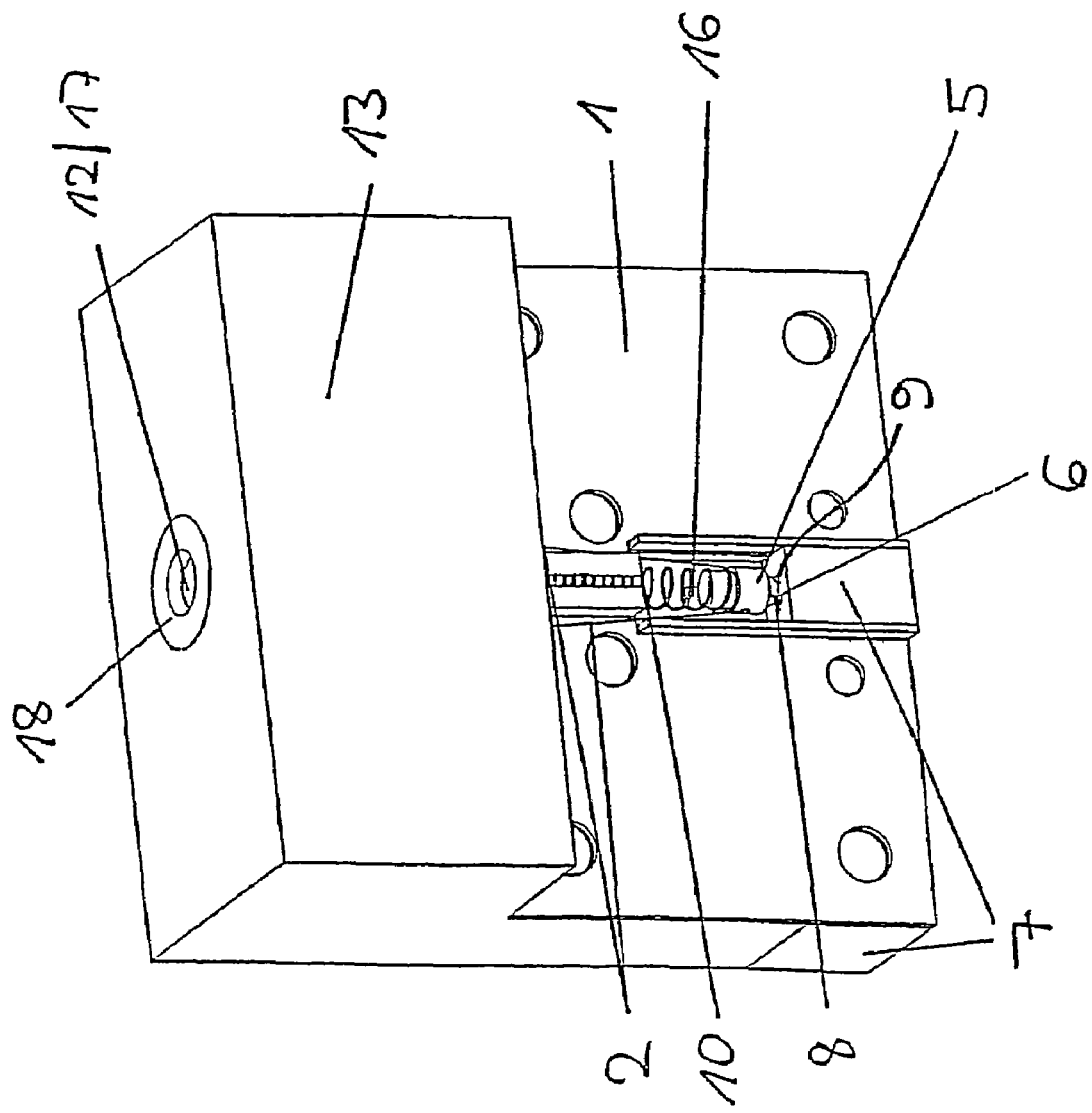
FIG. 3 shows a further more detailed exemplary embodiment of the present invention.

FIG. 3 shows a partially assembled illustration of a further exemplary embodiment of a valve in accordance with the present invention, in which the SMA wires 2 are disposed in accordance with sub-FIG. 1D of FIG. 1. These wires 2 are in this case likewise secured to a carrier plate 1 made from an aluminum oxide ceramic which, however, unlike in the configuration shown in FIG. 2, runs perpendicular to the base plate 7 of the valve, in which the passage opening 8 and the adjacently located recess 9 are formed. In this example, the ball 6 is guided by means of a ball holder 5, on which the coil spring 10 acts and to which the respective ends of the SMA wires 2 are secured. In this example too, the pressure with which the coil spring 10 is pressed on can once again be set by means of a sealing screw 17 and adjusting screw 12. In the configuration shown in this figure, the ground contact-connection of the wire ends disposed on the ball side is effected via the metallic ball holder 5, the metallic biasing spring 10 and a metal insert 18 in the plastic cover 13, which can be electrically contact-connected from the outside. This configuration also clearly requires little additional installation space for the actuating mechanism.

What is claimed is:

1. Valve, comprising:
    a base body with a passage opening;
    a movable valve member for closing and opening the passage opening; and
    an actuating mechanism, by means of which the valve member can be moved in order to open up the passage opening, the actuating mechanism having at least two elements in wire form made from a shape memory alloy, which elements are secured to the base body or a carrier body connected to the base body and can be shortened in the event of the temperature rising to a temperature above a threshold temperature;
    wherein the elements in wire form can be shortened alternately and are operatively connected to the valve member in such a way that the valve member can be moved from a stable position on the passage opening into a stable position close to the passage opening in the event of one element being shortened on one side, and can be moved back into the stable position on the passage opening in the event of the other element being shortened on one side;
    the two elements in wire form run approximately parallel to one another and perpendicular to a direction of movement of the valve member.

2. Valve according to claim 1, wherein the two elements in wire form comprise ohmic resistors capable of being heated to above the threshold temperature by the application of a current.

3. Valve according to claim 1, wherein the two elements in wire form are secured directly to the valve member.

4. Valve according to claim 3, wherein the two elements in wire form comprise ohmic resistors capable of being heated to above the threshold temperature by the application of a current.

5. Valve according to claim 1, wherein the two elements in wire form are secured to a guide element for guiding the valve member.

6. Valve according to claim 5, wherein the two elements in wire form comprise ohmic resistors capable of being heated to above the threshold temperature by the application of a current.

7. Valve according to claim 1, wherein:
    the valve member is disposed at a free end of the elements in wire form.

8. Valve according claim 7, wherein the two elements in wire form are secured directly to the valve member.

9. Valve according to claim 7, wherein the two elements in wire form are secured to a guide element for guiding the valve member.

10. Valve according to claim 7, wherein the two elements in wire form comprise ohmic resistors capable of being heated to above the threshold temperature by the application of a current.

11. Valve according to claim 1, wherein the valve member is a ball.

12. Valve according to claim 11, wherein a recess is formed in the base body next to the passage opening, which recess serves as seat for the ball in the open state of the valve.

13. Valve according to claim 12, wherein the ball is connected to a coil spring, by means of which the ball is respectively pressed onto the passage opening or the recess in the base body.

14. Valve according to claim 13, wherein the two elements in wire form are disposed on either side of the coil spring approximately parallel to an axis of the coil spring.

15. Valve, comprising:
    a base body with a passage opening and a recess next to the passage opening;
    a movable valve member in the form of a ball for closing and opening the passage opening;
    an actuating mechanism, by means of which the valve member can be moved in order to open up the passage opening, the actuating mechanism having at least two elements in wire form made from a shape memory alloy, which elements are secured to the base body or a carrier body connected to the base body and can be shortened in the event of the temperature rising to a temperature above a threshold temperature;
    a coil spring connected to the ball, by means of which the ball is respectively pressed onto the passage opening or the recess in the base body, which recess serves as seat for the ball in an open state of the valve; and
    wherein the elements in wire form can be shortened alternately and are operatively connected to the valve member in such a way that the valve member can be moved from a stable position on the passage opening into a stable position close to the passage opening in the event of one element being shortened on one side, and can be moved back into the stable position on the passage opening in the event of the other element being shortened on one side; and
    the two elements in wire form are disposed on either side of the coil spring approximately parallel to an axis of the coil spring.

* * * * *